United States Patent Office 2,921,179
Patented Jan. 12, 1960

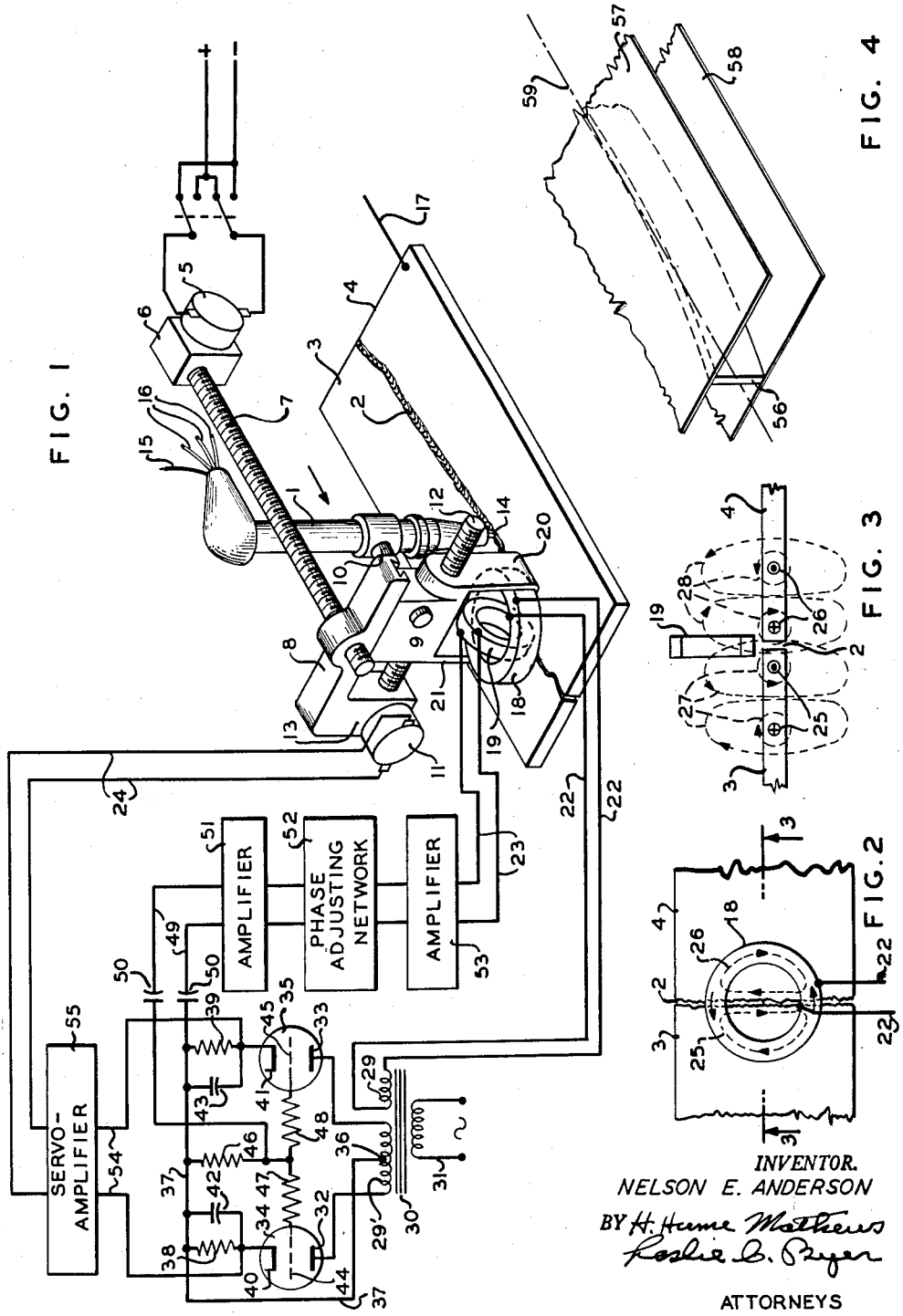

2,921,179

**ELECTROMAGNETICALLY LOCATING AND FOL-
LOWING WORKPART CONFIGURATIONS**

Nelson Edward Anderson, Berkeley Heights, N.J., assignor to Air Reduction Company, Incorporated, New York, N.Y., a corporation of New York Application November 20, 1958, Serial No. 775,187

19 Claims. (Cl. 219—125)

This invention relates to methods and apparatus for electromagnetically locating a seam, ridge or other discontinuity in the sectional contour of a workpart or a workpart assembly and for guiding a tool or other device in its lengthwise travel relative thereto to confine its action to that part of the workpart or workpart assembly which has a predetermined location relative to this discontinuity. The invention will be described in detail with regard to its use in traversing a welding agency along an exposed seam between the adjacent or abutting edges of the workparts in a workpart assembly to form a weld between the workparts. From this description of the invention it will become apparent that it may be used to follow a seam which is not exposed to view because it is covered by the unbroken surface of one of the workparts of an assembly at the junction between it and another workpart. It will also become apparent that the invention is equally applicable for following the edge of a workpart at a lap joint between workparts or for following ridges or similar configurations on the front or back surfaces of a workpart along which it is desired to traverse a tool in predetermined relation relative thereto.

The invention is of particular utility for use in guiding a welding agency or other tool of an automatic machine along a seam between workparts positioned relatively to the machine with the seam between the workparts deviating wholly or in part from the path of travel in the machine of the welding agency or other tool lengthwise of the seam. For example, in automatic welding, the welding agency must be traversed along a path of travel which will center it over the seam between the workparts as it travels lengthwise thereof to form a weld at the seam. To accomplish this result the edges of the workparts must be prepared to provide, upon assembly relative to the machine, a seam which can be aligned with the travel of the welding agency along the guide mechanism provided therefor in the machine. This requires accurate preparation of the workparts and careful placement of these workparts in an assembled relationship relative to the path of travel of the welding agency in the machine. Otherwise the machine operator must continuously observe the welding operation and make lateral adjustments of the welding agency relative to the seam to center it over the seam where the direction of travel of the welding agency in the machine is divergent from the direction of the seam between the workparts or from localized portions thereof. Since the seam between like workparts or like work assemblies will not usually have like variations in seam contour, a special work holding fixture alone or in combination with a special guide for the welding agency is not a satisfactory solution for this problem. Even if the seam between the assembled workparts has the contour of the path of travel of the welding agency, considerable time and care is required in positioning the workparts relatively to the machine so that the seam between them and the path of travel of the welding agency in the machine are in alignment with one another. It is consequently desirable to provide a method and apparatus which can be used for automatically following a seam between workparts which are assembled relatively to a machine in which the travel of the welding agency in the machine is not in complete alignment with the seam between the workparts. Such an arrangement will render the welding operation completely automatic and eliminate the difficulties above considered.

It is an object of this invention to provide electromagnetic methods and apparatus for following a workpart configuration such as the seam between parts thereof.

It is a further object of this invention to provide methods and apparatus for locating and following a workpart configuration by inducing eddy currents in a localized area of the workpart at said configuration and using the field of magnetic flux thereby produced to determine the location of said workpart configuration.

It is also an object of this invention to provide electromagnetic means including an exciter coil and a pick-up coil associated with one another and the workpart in predetermined relationship so that a changing flow of current in the exciter coil induces eddy current in a localized area of the workpart to produce a field of magnetic flux that links the pick-up coil and generates voltages therein which, by reason of their magnitude and phase relationship to the current flowing in the exciter coil, are employed to position both of the coils in a predetermined location relative to said configuration in the workparts.

Further objects and advantages of the invention will become apparent upon a consideration of the following description of one embodiment thereof which has been diagrammatically illustrated in the accompanying drawing.

In the drawing Fig. 1 is a representation of the mechanical and electrical parts of an automatic welding machine which is controlled in accordance with the invention to traverse a welding agency lengthwise of a seam between two workparts and center the welding agency over the seam when the direction of the seam does not correspond with the lengthwise travel of the welding agency in the machine;

Fig. 2 is an explanatory diagram which in conjunction with;

Fig. 3 is employed to explain the operating principle of the electromagnetic tracer head forming part of the machine of Fig. 1; and Fig. 4 is an illustration of an assembly of workparts having a seam which the apparatus shown in Fig. 1 is capable of following along the unbroken surface of one of the workparts which covers the seam.

In accordance with the invention eddy currents are induced by an exciting magnetic flux within a definite localized area of exploration which includes a portion or portions of the workparts at the configuration therein which it is desired to locate and follow and this localized area of exploration is moved laterally of the configuration to a location in which parts of the magnetic flux produced in the workpart or workparts on opposite sides of the configuration by the eddy currents induced therein, are substantially equal in magnitude and opposite in direction relative to a plane of reference which is normal to the surface or surfaces of the workpart or workparts and which has substantial equal linkages with parts of the exciting magnetic flux which extend in opposite directions laterally of the configuration in the workpart or workparts. More specifically an exciter coil and a pick-up coil forming parts of an electromagnetic tracer head are positioned relative to one another for zero induced voltage in the pick-up coil when the exciter coil is energized with a changing flow of current and the exciter coil is placed over the workpart configuration and energized with a changing flow of current to induce eddy currents in the workpart, and both of said coils are simultaneously moved laterally of a workpart configuration, while being traversed lengthwise thereof, to position the pick-up coil relative to the workpart configuration where there is a predetermined degree of balance between oppositely directed portions of the field of magnetic flux which is produced by the eddy currents induced at the workpart configuration and which link the pick-up coil, said degree of balance being indicated by the magnitude and phase of the voltages which are induced in the pick-up coil and which are employed for actuating a mechanism which moves the coils laterally of the workpart configuration to a predetermined position relative thereto.

In the drawing a welding agency is mounted on a support which is movable by one means lengthwise of the seam between two workparts and which is movable by another means crosswise of said seam. An electromagnetic tracer head is also mounted on this support in advance of the welding agency in its movement lengthwise of the seam. This tracer head comprises an exciter coil arranged to be energized with alternating current and a pick-up coil associated therewith and having its axis perpendicular to the axis of the exciter coil relative to which it is positioned for zero induced voltage by reason of its association with the exciter coil. These coils are positioned on the support for the welding agency so as to be in inductive relation with the workparts with the axis of the exciter coil perpendicular to the workparts and with the axis of the pick-up coil at right angles to the seam between the workparts. The relative positions of the welding agency and the tracer head on the support are such that, when the pick-up coil of the tracer head is centered over the seam, the welding agency is also centered over the seam. The voltages induced in the pick-up coil by the magnetic fluxes generated by currents produced in the workparts by energization of the exciter coil are supplied to an electric control apparatus which operates the means for moving the support for the welding agency and the tracer head crosswise of the seam to center the pick-up coil and the welding agency over the seam as the support for these members is moved lengthwise of the seam.

More specifically a welding agency 1 is traversed lengthwise of a seam 2 between workparts 3 and 4 by an electric motor 5 connected through gearing in a casing 6 to a lead screw 7 which extends generally in the lengthwise direction of the seam. This lead screw 7 imparts motion to a carrier 8 which acts as a support for a slide 9 on which the welding agency 1 is mounted by a bracket 10. The slide 9 is movable crosswise of the seam relative to its carrier 8 by an electric motor 11 which imparts rotation to a cross-adjusting screw 12 with which it is connected through gearing in a casing 13 forming part of carrier 8. Motor 11 and its gear transmission 13 is supported on one end of the carrier 8 and the cross-adjusting screw 12 makes a threaded engagement with the slide 9. The arrangement is such that reverse rotation of motor 11 will reversely adjust slide 9 relative to its carrier 8 to position the welding agency laterally of the seam as it is traversed lengthwise thereof by the electric motor 5 acting through its gear transmission 6 and lead screw 7 which engages and drives carrier 8. The electric motor 5 is connected as indicated to a source of supply by means of which its speed and direction of rotation are controlled to traverse the welding agency 1 along the seam between the workparts. In the arrangement shown the motors 5 and 11 are direct current shunt motors although it is quite obvious that other types of motors may be employed. It is of course understood that the parts of the machine just described are suitably supported relative to one another and to the workparts by other members of the machine which, for clarity of illustration, have not been shown in the drawing. Also the workparts will be held in assembled relationship in a clamp or clamps forming part of the machine or forming part of a jig which may be positioned in the machine or the machine may be positioned on or over the workparts which are otherwise assembled as by tack welding at spaced positions along the seam between them.

Any suitable welding agency may be employed and the one illustrated in the drawing is a gas-arc torch in which a shielding atmosphere is supplied about the arcing terminal of an electrode and the portions of the work rendered molten by an arc established between this electrode and the workparts. It may have the construction illustrated and described in my United States Letters Patent 2,512,705 for Fluid-Cooled Gas-Blanketed Arc Welding Torch, granted on June 27, 1950, on an invention made jointly with George R. Turbett. Welding current is supplied to the electrode 14 of the torch through a welding cable 15 and cooling fluid and shielding gas are supplied thereto through hoses 16. Welding current is also supplied to the workparts 3 and 4 through a welding cable 17 which is connected, as is cable 15, to the respective terminals of a suitable source of welding current supply.

An exciter coil 18 and a pick-up coil 19, constituting the electromagnetic tracer head of this invention, are positioned in proximity to the surface of the workparts 3 and 4 at the seam 2 between them by arms 20 and 21 forming part of the structure of slide 9. Alternating current is supplied to the exciter coil 18 through conductors 22 and the voltages induced in the pick-up coil 19 are supplied through conductors 23 to an electronic circuit the output of which is applied through conductors 24 to motor 11 to control its energization and direction of rotation in a manner to position the tracer head and the welding agency over the seam between the workparts.

The operating principle of the electromagnetic tracer head will be explained by a sequential consideration of the diagrams shown in Figs. 2 and 3, which for clarity of illustration independently show the functions of the exciter coil 18 and the pick-up coil 19 forming components thereof. When the exciter coil 18 is positioned over the edges of workparts which are spaced from one another or form a high resistance continuous or discontinuous contact with one another as shown in Fig. 2, the instantaneous flow of current in a counter-clockwise direction through the turns of this coil will induce loops of induced eddy current flow in the edges of the workparts as shown by the dotted lines 25 and 26. These induced loops of current flow will be in a clockwise direction as indicated, being the summation of a plurality of localized eddy current flows produced in the workpart edges by the exciting magnetic flux of coil 18. The localized eddy current flows immediately adjacent to each other in integral parts of the edge portions of the workparts are in opposite directions to one another and therefore cancel out leaving as the resultant induced current the summation of all these eddy current flows which produces the current loops 25 and 26 referred to. These loops of current 25 and 26 induced in the workparts 3 and 4 produce at the seam 2 between them a magnetic field, the lines of force of which have been indicated in part by lines 27 and 28 which are indicative of the total field produced by the flow of these currents. The direction of current flow in the edge portions of the workparts 3 and 4 have been indicated by the conventional cross and point enclosed within circles to show respectively current flow away from and toward the observer and the indicated lines of magnetic flux 27 and 28 have been provided with arrows to show their direction relative to the workparts 3 and 4 and the turns of the pick-up coil 19. It will be seen from Fig. 3 that when the pick-up coil 19 is centered over the seam 2 between workparts 3 and 4, that the flux linkages in opposite direction therewith are equal and opposite and consequently no voltage is induced in coil 19 by the field of magnetic flux set up by the currents 25 and 26 induced in the edge portions of the workparts at the seam by the exciter coil 18. If, however, the pick-up coil 19 is displaced laterally in either direction from its position illustrated in Fig. 3, it is apparent that the flux linkages in one direction through this coil will be greater than the flux linkages in the opposite direction therethrough. This will induce voltages in the pick-up coil 19 which are in opposite phase relative to that applied to the turns of the exciter coil 18. The magnitude of these voltages and their relative phase to the voltage applied to exciter coil 18 is employed to energizing a servo-amplifier which controls the flow of current in one direction or the other through conductors 24 to electric motor 11 to control its rotation in one direction or the other to position coils 18 and 19 of the electromagnetic tracer head relative to the seam 2 between workparts 3 and 4 so that the welding agency is continuously centered over the seam as it is traversed lengthwise of the seam.

As shown by the control circuit illustrated in the drawing, the exciter coil 18 is energized through conductors 22 thereof by the voltage of a secondary winding 29 of a supply transformer 30 having a primary winding 31 the terminals of which are connected to a source of alternating current as indicated. Transformer 30 also has another secondary winding 29′ the end terminals of which are respectively connected to the anodes 32 and 33 of electric discharge devices 34 and 35. A mid-terminal 36 of secondary winding 29′ of transformer 30 is connected through a conductor 37 and cathode resistors 38 and 39 respectively to the cathodes 40 and 41 of the electric discharge devices 34 and 35. These cathode resistors are shunted by capacitors 42 and 43 which complete control circuits between the cathodes 40 and 41 of the electric discharge devices 34 and 35 and their respective control elements 44 and 45 across a resistor 46 and through resistors 47 and 48 respectively connected in circuit with the control elements 44 and 45. The control voltage for electric discharge devices 34 and 35 is applied across resistor 46 through conductors 49 and coupling capacitors 50 connected in circuit with each of the conductors 49. Conductors 49 are connected through an amplifier 51, a phase adjusting network 52, and an amplifier 53 to conductors 23 across which the voltage induced in pick-up coil 19 is applied. The phase adjusting network 52 is employed to produce a proper phase relationship between the voltages applied to the control elements 44 and 45 of electric discharge devices 34 and 35 and the voltages applied to the anodes 32 and 33 of these devices. The operation of the discriminator including electric discharge devices 34 and 35 is such that the voltages of its output conductors 54 is zero or reverses in polarity depending on the position of the pick-up coil 19 being centered over the seam or displaced laterally relatively thereto in opposite directions. The output voltage across conductors 54 operates a servoamplifier 55 which controls the voltage and its polarity applied through conductors 24 to electric motor 11 in a manner to control its rotation and the consequent position of the pick-up coil 19 over the seam 2 between workparts 3 and 4. This in turn controls the position of the welding agency 1 over the seam and causes the welding agency to follow lateral deviations in the seam as it is traversed generally lengthwise thereof by the operation of electric motor 5.

The discriminator operates as follows: By reason of the connections employed, the voltages applied to the anodes 32 and 33 of electric discharge devices 34 and 35 are 180° out of phase. When pick-up coil 19 of the tracer head is centered over the seam no signal voltage is induced therein and applied through the circuit above described to the control elements 44 and 45 of the discharge devices 34 and 35. These devices 34 and 35 will consequently supply substantially equal currents through cathode resistors 38 and 39 and there will be no voltage difference between the input conductors 54 of the servo-amplifier 55. When the pick-up coil 19 is displaced in one direction laterally of the seam 2 between the workparts, there will be a voltage induced in coil 19 and applied to control elements 44 and 45 of electric discharge devices 34 and 35 which will be in phase with the anode voltage of one of the two devices and increase its conduction to cause its cathode voltage to be at a more positive value and which at the same time will be out of phase with the anode voltage of the other of these devices and decrease its conduction and thereby lower its cathode voltage. When pick-up coil 19 is displaced in the opposite direction laterally of seam 2, the above conditions will be reversed. Therefore, an "on-seam" position of the pick-up coil 19 produces no potential difference between the output conductors 54 of the discriminator and an "off-seam" position of this pick-up coil produces a potential difference between these conductors, the polarity of which reverses depending upon which side of the seam the pick-up coil 19 is off center.

From the above description it is believed to be apparent that as coils 18 and 19 of the electromagnetic tracer head are traversed lengthwise of seam 2 between workparts 3 and 4, any deviations from correspondence between the path of travel imparted to this tracing head by the guides in the welding machine from the direction of the seam between the workparts will induce voltages in the pick-up coil 19 which through operation of the control circuit for electric motor 11 will operate this motor to position pick-up coil 19 of the electromagnetic tracer over the seam and consequently at the same time position the welding agency 1 over the seam.

In the arrangement illustrated the exciter coil 18 and the pick-up coil 19 of the electromagnetic tracer head are positioned a predetermined distance in advance of the arc of the welding agency 1 which is acting to produce a weld closing the seam. It may consequently be desirable to have the tracer head follow the seam and to delay in some manner the response of the means for positioning the welding agency so that it will be brought in proper coincidence with the seam when it arrives at the position in which the tracer head determined a deviation in the direction of the seam between the workparts relative to the longitudinal path of travel of the tracer head and welding agency in the welding machine. Such an arrangement will not be needed if the electromagnetic tracer head is positioned closely adjacent the welding agency or if departures in the seam direction are gradual. Such a close positioning of these members may be accomplished by reducing the size of the coils of the tracer head and suitably insulating them from or making them resistant to the heat radiated by the welding agency.

The frequency of the alternating current applied to the exciter coil 18 of the electromagnetic tracer head will determine the depth at which the eddy currents induced in the workparts are caused to flow a maximum value. This is due to the so-called "skin-effect" which causes a crowding of the current flow to the surface of the workparts because of the increased magnetic induction which increase the impedance of the inner portions of a conductor so as to cause the current to flow at the surface thereof. The depth at which the induced current flows will be determined by the frequency of the exciting current supplied to the exciter coil 18 relative to the specific resistance and magnetic permeability of the workparts. By a proper adjustment of these values the eddy currents induced at the edge portions of the workparts 3 and 4 may be caused to flow at greatest intensity near the surface of these workparts over which the exciter coil 18 is located. It is however possible by a proper control of these values to have the eddy current flow at greatest intensity at a distance spaced from that surface of the workparts which is adjacent to the exciter coil 18. Thus it is possible to induce eddy currents at the seam between a spacing member 56 and a cover sheet 57 of a work assembly of parts 56, 57 and 58 as shown in Fig. 4 so that the tracer head will follow the edge configuration of the member 56 at the seam although the cover sheet 57 presents an unbroken surface to the exciter coil 18 placed directly thereover. Thus the control above described may be employed for following the edge contour of the spacing member 56 when the seam between it and the cover sheet 57 departs from the line of travel of the welding agency and the electromagnetic tracer head which has been indicated in Fig. 4 by the dot and dash line 59.

It is apparent that the electromagnetic tracer head above described can also be employed for following the edge of a workpart at a lap joint between workparts or for following ridges or similar configurations on the front or back surface of a workpart along which it is desired to traverse a welding agency or other device in predetermined position relative thereto. It is also apparent that the apparatus may be used for following a surface crack in a workpart with the same facility that it follows a seam between the abutting edges of two workparts as pointed out above in describing the invention with regard to the illustration in Fig. 1.

The coils of the tracer head may be shielded from stray magnetic fields by enclosing them within metallic members which are separated from one another at the central plane of the turns of the pick-up coil. Means may be provided for centering the pick-up coil relative to the cooperative members of which this shield is made.

Where the edges of the workparts are held by metal clamps, the tracer head may follow the edge of one of the clamps in preference to following the seam between the workparts held in assembled relation by these clamps. This undesired operation can be prevented by slotting the edges of the work clamps to reduce to very small values the eddy current flows induced by the exciter coil in the edges of the work clamps that are adjacent a workpart seam or like configuration which is to be followed by the tracer head.

Obviously the invention is not limited to the use of alternating current for energizing the exciter coil since any other changing flow of current may be used, for example pulsating, surging or oscillating currents. Furthermore, other forms and organizations of the electric control elements may be substituted for the particular arrangement thereof above illustrated and described. Also any form of tool or other device may be substituted for the welding agency and any other organization of the elements of a machine may be used in place of the arrangement illustrated.

Various applications and modifications of the invention will become apparent from the description thereof given above. For example the support for the workpart or workpart assembly may be moved bodily relative to a stationary welding agency or tool and its associated tracer head by a suitable mechanism controlled by the tracer head as described above to position a seam, ridge, or other discontinuity in the section contour of the workpart or workpart assembly during its lengthwise travel in the machine relative to said welding agency or tool. Other rearrangements of the elements of an automatic machine will be obvious to those skilled in the art in view of the above detailed description of the invention as applied to a particular automatic machine. It is consequently to be understood that the invention is not limited to the single embodiment thereof above illustrated and described and that the appended claims are intended to cover all modifications of the invention which fall within the true spirit and scope thereof.

What is claimed is:

1. Apparatus comprising an exciter coil having terminals and connections for the energization thereof with a changing flow of electric current, means for positioning an end of said exciter coil opposite a surface of a workpart to induce eddy currents therein upon a changing flow of electric current in said exciter coil, a pick-up coil positioned relative to said exciter coil for zero induced voltage therein from said exciter coil upon a changing flow of electric current in said exciter coil and also positioned relative to the workpart for an induced voltage therein the magnitude of which is determined by the unbalanced field of magnetic flux generated by said eddy currents induced in said workpart by a changing flow of electric current in said exciter coil, and means responsive to the magnitude and direction of the voltages induced in said pick-up coil by oppositely directed parts of the field of magnetic flux generated in the workpart by said eddy currents induced therein by a changing flow of current in said exciter coil for moving both of said coils in their said predetermined positions relative to one another and the workpart across said surface of said workpart to a position in which there is a predetermined degree of balance of the flux linkage in opposite directions through said pick-up coil.

2. Apparatus comprising an exciter coil having connections for energizing it with a changing flow of electric current, a pick-up coil positioned relatively to said exciter coil for balanced linkages with oppositely directed portions of the field of magnetic flux produced solely by a changing flow of electric current in said exciter coil, means for simultaneously moving both of said coils in their said predetermined positions relative to one another in opposite directions lengthwise of said pick-up coil with the end of said exciter coil facing and spaced a predetermined distance from the surface of said workpart, and means for controlling said last mentioned means in response to the magnitude and direction of the voltages induced in said pick-up coil by the field of magnetic flux produced by the flow of eddy currents induced in said workpart by a changing flow of electric current in said exciter coil and localized in the workparts to areas thereof determined by its configuration, said means operating said last mentioned means in a direction to position said pick-up coil in said field of magnetic flux where there is a predetermined degree of balance between oppositely directed portions thereof which link said pick-up coil.

3. Apparatus comprising an exciter coil having connections for energizing it with a changing flow of electric current, means for positioning said exciter coil opposite the surface of a workpart to induce eddy currents therein in areas localized by the configuration of said workpart when said exciter coil is energized by a changing flow of current therein, a pick-up coil positioned relatively to said exciter coil for balanced magnetic flux linkages with the field of magnetic flux produced solely by a changing flow of electric current in said exciter coil, means for simultaneously moving both of said coils in their said predetermined positions relative to one another in opposite directions lengthwise of said pick-up coil, and means responsive to the magnitude and direction of the voltages induced in said pick-up coil by the field of magnetic flux produced by the localized flow of eddy currents induced in said workpart by said exciter coil for operating said last mentioned means in a direction to position said pick-up coil in said field of magnetic flux where there is a predetermined degree of balance between oppositely directed portions thereof which link said pick-up coil.

4. Apparatus comprising an exciter coil having terminals and connections for the energization thereof with a changing flow of electric current, means for positioning said exciter coil opposite and at a predetermined distance from a surface area of said workpart assembly where there is an underlying discontinuity in the thickness of the material in said workpart assembly whereby eddy currents induced in said material of said workpart assembly by a changing flow of electric current in said exciter coil are productive of a field of magnetic flux parts of which extend in opposite direction laterally of said discontinuity, a pick-up coil positioned relative to said exciter coil for zero induced voltage therefrom and relative to said workpart assembly for linkage with said oppositely directed parts of said field of magnetic flux produced in said workpart assembly by a changing flow of electric current in said exciter coil, and means responsive to the voltages induced in said pick-up coil by flux linkages with said field of magnetic flux generated in said workpart assembly by said exciter coil for simultaneously moving both of said coils in their said predetermined positions relative to each other and said surface of said workpart assembly to locate said pick-up coil in a predetermined position relative to said discontinuity in the thickness of the material of said workpart assembly.

5. Apparatus for following a seam between conductive materials and comprising an exciter coil arranged to be energized with alternating current and positioned in inductive relation with said workparts on opposite sides of a portion of said seam, a pick-up coil associated with said exciter coil for zero induced voltage therefrom and responsive to the electromagnetic fluxes generated in said workparts on opposite sides of said seam by the currents induced therein by energization of said exciter coil for providing an induced voltage in said pick-up coil upon lateral displacement thereof from a predetermined position relative to said seam, means for traversing said coils along said seam, and means responsive to the magnitude and phase of said voltage induced in said pick-up coil for returning said pick-up coil to said predetermined position relative to said seam during its travel along said seam.

6. Seam following apparatus comprising a support, means for mounting said support on a member which is movable by one means lengthwise of a seam between workparts and which is movable by another means crosswise of said seam, an exciter coil arranged to be energized with alternating current, a pick-up coil associated with said exciter coil and having its axis perpendicular to the axis of said exciter coil relative to which it is positioned for zero induced voltage by reason of its association therewith, means for positioning said coils on said support in inductive relation to said workparts with the axis of said exciter coil perpendicular to said workparts and with the axis of said pick-up coil at right angles to the seam between said workparts, and means responsive to the voltage induced in said pick-up coil by the magnetic fluxes generated by the currents produced in said workparts by energization of said exciter coil for operating said other means for crosswise movement of said support to center said pick-up coil over said seam.

7. Apparatus for following a seam between workparts of an electrically conductive material said apparatus comprising a first electromagnetic means arranged to be energizedw with alternating current and to be supported in inductive relation with a definite localized surface area of said workparts including a portion of said seam, a second electromagnetic means which is supported relative to said first electromganetic means and said workparts in a position in which it is insensitive to the magnetic flux of said first electromagnetic means and in which it is sensitive to the resultant flux at said seam produced by currents induced in the edge portions of said workparts by energization of said first electromagnetic means, means for traversing both of said electromagnetic means along said seam in their said predetermined positions relative to one another, means for traversing both of said electromagnetic means transversally of said seam in their said predetermined positions relative to one another, and means responsive to the voltage induced in said second electromagnetic means by the magnetic fluxes produced by the currents induced in the edge portions of said workparts by said first electromagnetic means for operating said tranverse traversing means to position said second electromagnetic means over said seam where the magnetic fluxes produced by said currents in said workparts and acting on said second electromagnetic means are equal in magnitude and opposite in direction.

8. Apparatus for following a seam between workparts of conducting material said apparatus comprising electromagnetic means supported in inductive relation with localized portions of said workparts on opposite sides of said seam, means including terminals for applying an alternating current excitation to said electromagnetic means, means for traversing said electromagnetic means over said workparts along a path of travel which in direction is divergent from the direction of localized portions of said seam, a second electromagnetic means movable with said first electromagnetic means and positioned relative thereto for zero net magnetic flux linkages therewith and positioned relative to said seam at said localized portions of said workparts which are acted on by said first mentioned electromagnetic means for linking the resultant magnetic flux produced by loops of current induced in the edges of said workparts by excitation of said first mentioned electromagnetic means, said resultant magnetic flux producing an induced voltage in said second electromagnetic means which varies in magnitude and phase with its lateral displacement to either side of a predetermined position relative to said seam, and means responsive to said voltage induced in said second electromagnetic means for moving both of said electromagnetic means laterally of their path of travel along said seam by said traversing means to return said second electromagnetic means to said predetermined position relative to said seam.

9. Seam welding apparatus comprising an exciter coil arranged to be energized with alternating current, a pick-up coil associated with said exciter coil and having its axis perpendicular to the axis of said exciter coil relative to which it is positioned for zero induced voltage by reason of its association therewith, means for positioning said coils in inductive relation to said workparts with the axis of said exciter coil perpendicular to said workparts and with the axis of said pick-up coil at right angles to the seam between said workparts, a welding agency positioned relative to said coils to be over said seam when said pick-up coil is centered over said seam, means for traversing said coils and said welding agency along said seam, and means responsive to the voltage induced in said pick-up coil by the resultant magnetic flux generated by the currents produced in said workparts by energization of said exciter coil for centering said pick-up coil over said seam.

10. Apparatus comprising a welding agency, means for traversing said welding agency along a seam between workparts of conducting materials, and electromagnetic means for positioning said welding agency over said seam during its travel along said seam, said electromagnetic means including an exciter coil arranged to be energized with alternating current and positioned in inductive relation with said workparts on opposite side of a portion of said seam in advance of the welding agency in its travel along said seam, a pick-up coil associated with said exciter coil for zero induced voltage therefrom and with said workparts for an induced voltage from the resultant magnetic flux generated in said workparts by the currents induced therein by energization of said exciter coil, the magnitude and phase of said induced voltage depending on the lateral displacement of said coil in opposite directions from a predetermined position relative to said seam, and means responsive to the magnitude and phase of said voltage induced in said pick-up coil for returning said pick-up coil to said predetermined position.

11. Apparatus comprising a welding agency, means for transversing said welding agency along a workpart configuration at a junction of two parts of said workpart, and electromagnetic means for centering said welding agency over said workpart configuration, said electromagnetic means including an exciter coil arranged to be energized with alternating current and a pick-up coil associated with said exciter coil and having its axis perpendicular to the axis of said exciter coil relative to which it is positioned for zero induced voltage by reason of its association therewith, means for supporting said coils of said electromagnetic means in a predetermined position relative to said workpart when said welding agency is centered over said workpart configuration, the axis of said exciter coil being perpendicular to said workpart and the axis of said pick-up coil being at right angles to said workpart configuration, and means responsive to the magnitude and phase of the voltage induced in said pick-up coil of said electromagnetic means upon its lateral displacement from said predetermined position relative to said workpart configuration for returning said electromagnetic means to said predetermined position relative to said workpart configuration and thereby centering said welding agency over said workpart configuration during its travel along said workpart configuration.

12. Apparatus comprising a welding agency, means for transversing said welding agency along a seam to be welded between workparts of conductive material, and electromagnetic means for centering said welding agency over said seam, said electromagnetic means including an exciter coil arranged to be energized with alternating current and a pick-up coil associated with said exciter coil and having its axis perpendicular to the axis of said exciter coil relative to which it is positioned for zero induced voltage by reason of its association therewith, means for supporting said coils of said electromagnetic means in a predetermined position relative to said seam when said welding agency is centered over said seam, the axis of said exciter coil being perpendicular to said workparts and the axis of said pick-up coil being at right angles to said seam between said workparts, and means responsive to the magnitude and phase of the voltage induced in said pick-up coil of said electromagnetic means upon its lateral displacement from said predetermined position relative to said seam for returning said electromagnetic means to said predetermined position relative to said seam and thereby centering said welding agency over said seam during its travel along said seam.

13. The method of locating a discontinuity in the configuration of a workpart at a section thereof which is normal to one of its surfaces which comprises energizing a coil with a changing flow of current and determining for said coil a plane of reference which extends axially of said coil and wherein there is a balance of linkages with oppositely directed portions of the field of magnetic flux generated solely by energization of said coil with said changing flow of current, generating eddy currents in said workpart by energizing said coil with a changing flow of current and positioning it at a predetermined distance from said surface of said workpart with its said plane of reference normal thereto and determining the correspondence of said plane of reference of said coil with the plane through said section of said workpart including said discontinuity by locating said coil relative to the workpart so that said plane of reference has equal and opposite linkages with the field of magnetic flux generated by said eddy currents induced in said workpart by said coil.

14. The method of locating a discontinuity in the configuration of a workpart at a section thereof which is normal to one of its surfaces which comprises energizing a coil with a changing flow of current and determining for said coil a plane of reference which extends axially of said coil and wherein there is a balance of linkages with oppositely directed portions of the field of magnetic flux generated solely by energization of said coil with said changing flow of current, generating eddy currents in said workpart by energizing said coil with a changing flow of current and positioning it at a predetermined distance from said surface of said workpart with its said plane of reference normal thereto, controlling the depth of penetration of said eddy currents in said workpart by controlling the frequency of the energization of said coil with said changing flow of current, and determining the correspondence of said plane of reference of said coil with the plane through said section of said workpart including said discontinuity by locating said coil relative to the workpart so that said plane of reference has equal and opposite linkages with the field of magnetic flux generated by said eddy currents induced in said workpart by said coil.

15. The method of locating a seam between workparts of electrical conductive material which comprises using a coil energized by a changing flow of current to induce eddy currents in said workparts within a definite localized area of exploration which includes portions of said workparts on each side of a portion of said seam, determining for such coil a plane of reference which extends axially of said coil and wherein there is a balance of linkages with the field of magnetic flux generated by energization of said coil with said changing flow of current, and moving said coil energized with said changing flow of current laterally of said seam and at a predetermined distance from the surface of said workpart to a position in which said plane of reference of said coil has substantially equal and opposite linkages with the field of magnetic flux generated by the flow of said eddy currents induced in said workparts by said coil, said position of said coil relative to said workparts being indicative of the location of said seam between said workparts.

16. The method of following a workpart configuration which comprises positioning two coils relative to one another with their axes at right angles to one another and with one of said coils located relative to the other of said coils for zero induced voltage therein when said other coil is energized with a changing flow of current, positioning said coils over the workpart with said other coil covering said workpart configuration and with its axis perpendicular to the workpart and with the axis of said one coil at right angles to said workpart configuration, energizing said other coil with a changing flow of current, setting the frequency of said changing flow of current supplied to said other coil at a value which causes the eddy currents induced thereby in said workpart to be located at said configuration thereof, and simultaneously moving said coils laterally of said workpart configuration in their said predetermined positions relative to one another and at a uniform spacing from the workpart as these coils are moved lengthwise of said workpart configuration to maintain in said one coil a predetermined voltage induced therein by the field of magnetic flux produced by the eddy currents induced in said workpart by said changing flow of current in said other coil.

17. The method of directing a welding agency along a workpart configuration which comprises positioning two coils relative to one another with their axes at right angles to one another and with one of said coils located relative to the other of said coils for zero induced voltage therein when said other coil is energized with a changing flow of current, positioning said coils over the workpart with said other coil covering said workpart configuration and with its axis perpendicular to the workpart and with the axis of said one coil at right angles to said workpart configuration, energizing said other coil with a changing flow of current, setting the frequency of said changing flow of current supplied to said other coil at a value which causes the eddy currents induced thereby in said workpart to be located at said configuration thereof, positioning said coils relative to a welding agency so that when said welding agency is centered over said workpart configuration a predetermined voltage is induced in said one coil by the field of magnetic flux produced by the eddy currents induced in said workpart by said changing flow of current in said other coil, and simultaneously moving said welding agency and said coils laterally of said workpart configuration in their said predetermined positions relative to one another and at a uniform spacing from the workpart as the welding agency and said coils are moved lengthwise of said workpart configuration to maintain in said one coil said predetermined voltage induced therein when said welding agency is centered over said workpart configuration.

18. The method of locating a seam between workparts of electrically conductive material which comprises inducing electric currents in said workparts within a definite localized area of exploration which includes portions of said workparts on each side of a portion of said seam, moving said localized area of exploration laterally of said seam to a position in which, relative to a plane of reference which is normal to the surfaces of said workparts and divides said localized area into equal parts, the magnetic fluxes produced by said electric currents induced in said portions of said workparts on opposite sides of said seam and within said area of exploration are substantially equal in magnitude and opposite in direction, and using said plane of reference in its position thus determined to indicate the location of said seam.

19. The method of following a seam between workparts which comprises positioning two coils relative to one another with their axes at right angles to one another and with one of said coils located relative to the other of said coils for zero induced voltage therein from the magnetic flux generated solely by the energization of said other coil with a changing flow of current, positioning said coils over the workparts with said other coil covering the edge portions thereof at said seam and with its axis perpendicular to the workparts and with the axis of said one coil at right angles to the seam between said workparts, energizing said other coil with a changing flow of current, and simultaneously moving said coils laterally of the seam in their said predetermined positions relative to one another and at a uniform spacing from the workparts, as these coils are moved lengthwise of the seam, to maintain in said one coil a predetermined voltage induced therein by the field of magnetic flux produced by the eddy currents induced in said workparts by said changing flow of current in said other coil.

References Cited in the file of this patent
UNITED STATES PATENTS

| | | |
|---|---|---|
| 1,997,272 | Adams | Apr. 9, 1935 |
| 2,557,046 | Evans | June 12, 1951 |
| 2,588,386 | Hubbard et al. | Mar. 11, 1952 |
| 2,670,423 | Darner et al. | Feb. 23, 1954 |